United States Patent
Zyren

(10) Patent No.: US 6,377,608 B1
(45) Date of Patent: Apr. 23, 2002

(54) PULSED BEACON-BASED INTERFERENCE REDUCTION MECHANISM FOR WIRELESS COMMUNICATION NETWORKS

(75) Inventor: James G. Zyren, Indialantic, FL (US)

(73) Assignee: Intersil Americas Inc., Irvine, CA (US)

( * ) Notice: Subject to any disclaimer, the term of this patent is extended or adjusted under 35 U.S.C. 154(b) by 0 days.

(21) Appl. No.: 09/163,802

(22) Filed: Sep. 30, 1998

(51) Int. Cl.[7] .................................................. H04K 1/00
(52) U.S. Cl. .................................................... 375/132
(58) Field of Search ................................. 375/130, 132, 375/140, 141, 220; 370/320, 335, 342, 441, 479; 455/403, 418, 434, 440, 456, 462, 556, 515, 501, 524, 63, 67.3

(56) References Cited

U.S. PATENT DOCUMENTS

| | | | | |
|---|---|---|---|---|
| 5,542,120 A | * | 7/1996 | Smith et al. | 455/425 |
| 5,784,368 A | * | 7/1998 | Weigand et al. | 370/350 |
| 5,809,421 A | * | 9/1998 | Manssen et al. | 455/434 |
| 5,926,470 A | * | 7/1999 | Tiedmann, Jr. | 370/334 |
| 6,028,853 A | * | 2/2000 | Haartsen | 370/338 |
| 6,128,290 A | * | 10/2000 | Carvey | 370/347 |
| 6,226,317 B1 | * | 5/2001 | Bruckert et al. | 375/146 |
| 6,246,884 B1 | * | 6/2001 | Karmi et al. | 455/521 |

\* cited by examiner

*Primary Examiner*—Chi Pham
*Assistant Examiner*—Emmanuel Bayard
(74) *Attorney, Agent, or Firm*—Gary R. Stanford

(57) ABSTRACT

A repetitively pulsed beacon based mechanism prevents interference between wireless communication devices of users of a band wireless local area network WLAN, and wireless communication devices of ad hoc networks using the same ISM band. A beacon generator is installed in the vicinity of an access point of the WLAN infrastructure, and generates a wireless beacon in a portion of the ISM band that does not overlap that portion used by the WLAN. A beacon responsive radio control mechanism, installed in each ad hoc radio, monitors the beacon channel for the presence of the wireless beacon. In response to detecting the beacon, the radio control mechanism adjusts the operation of its ad hoc radio, to avoid simultaneous use of the same portion of the ISM band as the WLAN. In one example, the ad hoc radio is adjusted so that it transmits within a selected portion of the ISM band other than that used by the WLAN.

44 Claims, 6 Drawing Sheets

TABLE
| FHSS Channel Designation | Center Frequency (GHz) |
|---|---|
| 76 | 2.476 |
| 77 | 2.477 |
| 78 | 2.478 |
| 79 | 2.479 |
| 80 | 2.480 |
FIG. 16
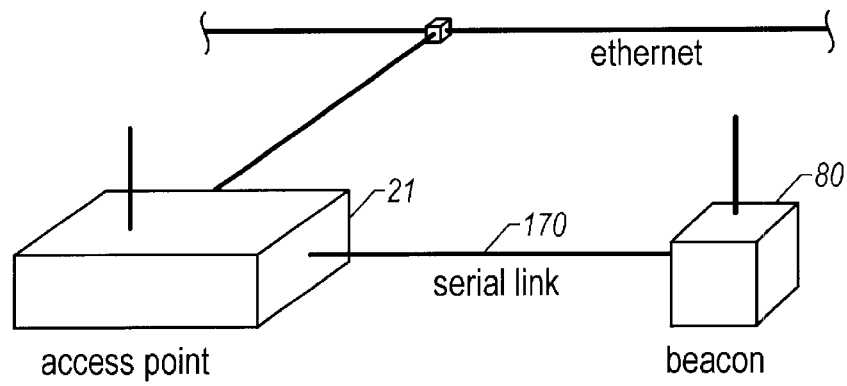
FIG. 17
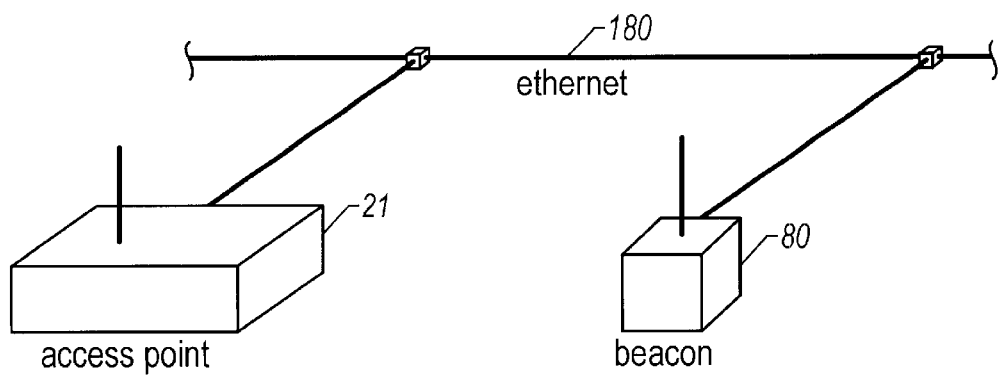
FIG. 18

PULSED BEACON-BASED INTERFERENCE REDUCTION MECHANISM FOR WIRELESS COMMUNICATION NETWORKS

FIELD OF THE INVENTION

The present invention relates in general to wireless local area networks, and is particularly directed to an access point-associated, pulsed beacon-based mechanism for reducing the potential for or avoiding interference between wireless communication devices of users of a communication network, such as one employing the unlicensed industrial, scientific and medical (ISM) band, and wireless communication devices of non-users of the network, who are located within a basic service area of the network, and are capable of transmitting within the same bandwidth portion of the wireless communication spectrum as, and thereby potentially interfering with, the users of the network.

BACKGROUND OF THE INVENTION

Because the (2.400–2.4835 GHz) industrial, scientific and medical (ISM) band is unlicensed and reasonably wide, it is anticipated to soon undergo substantial crowding, as wireless devices capable of transmitting at data rates in excess of 10 Mbps are expected to become increasingly common in the enterprise environment in the next few years. For example, as illustrated diagrammatically in FIGS. 1 and 2, it can be expected that one or more ad hoc networks (or 'piconets') 10, such as those comprised of a wireless phone 11 and laptop computer 13 wirelessly linked to each other (e.g., via associated Bluetooth radios), will be carried into a building having an infrastructure high speed wireless local area network (WLAN). Note that ad hoc network 10 is one which is temporary in nature, and typically contains two or more mobile nodes which communicate with each other and do not make use of the infrastructure WLAN.

Although not directly communicating with the access point (AP) 21 of the WLAN infrastructure's basic service area (BSA) 20, by transmitting in the ISM band, wireless communications between the cell phone 11 and laptop computer 13, such as downloading of e-mail to the laptop, for example, may interfere with, or suffer interference from, the infrastructure WLAN. Namely, as there will be multiple devices operating in the same unlicensed frequency band (i.e., 2.400–2.4835 GHz) as Bluetooth, HomerRF, and IEEE 802.11 specification-based frequency hopped spread spectrum (FHSS) radios, it is essential that the various radio systems utilizing the ISM band be capable of at least some degree of coexistence. This interference issue is of concern to all users of the band and, because most wireless communication devices are mobile, it is currently substantially impossible to predict the severity of the interference problem. Indeed, at present, none of the above-referenced systems are capable of operating in the presence of any of the others without causing potentially serious levels of interference.

SUMMARY OF THE INVENTION

In accordance with the present invention, this problem is effectively obviated by taking advantage of the availability of a prescribed unused region of portion of the ISM band (at either or both ends of the ISM band) to generate a pulsed warning beacon, that serves to alert ad hoc network radios (such as frequency hopped spread spectrum (FHSS) radios), that they are spatially close to a WLAN infrastructure access point, and thereby in the range of potential interference with the WLAN. To combat potential fading of the beacon signal, two beacons alternatively may be generated at lower and upper unused band regions of the ISM band. For example, by placing a first warning beacon at 2.401 GHz and a second warning beacon at 2.482 GHz, the probability of loss of beacon signal due to simultaneous fading on two non-correlated channels is significantly reduced.

The warning beacon is sourced from a beacon generator that is spatially located in close proximity to and linked with infrastructure access point. By close proximity is meant that the beacon generator and access point are spaced sufficiently far apart to provide isolation that minimizes adjacent channel interference; yet they are still close enough to ensure the AP and beacon coverage areas are approximately the same. The beacon generator is operative to periodically generate a pulsed beacon signal which, because of its physical proximity to access point, serves to indicate the presence of infrastructure WLAN and its associated BSA. The beacon generator may be serially interfaced with the access point in order to convey information about AP spectrum utilization to the mobile nodes. Alternatively, the beacon generator may communicate with the access point via a wired LAN (Ethernet). Communication from the access point to the beacon generator need not occur frequently, since it is only necessary to communicate when the access point is turned on or off, or when the beacon frequency channel is changed.

By periodically tuning the receive frequency synthesizer of its transceiver to this frequency, a node in an ad hoc network radio, such as an FHSS radio, is able to monitor whether it is in close proximity to an infrastructure network. Because FCC regulations permit a low power transmitter to periodically increase its transmit power by as much as 20+dBm, as long as average power remains below 0 dbm, the beacon signal emitted by beacon generator preferably has a pulsed beacon profile. The beacon may also be modulated with information relating the operation of the infrastructure network, such as the center frequency of the occupied channel, where the BSA is that of a DSSS infrastructure WLAN. In the case of an infrastructure FHSS network, the hop sequence and system clock data are embedded in the beacon signal.

In order to monitor and respond to the pulsed warning beacon that is sourced from the vicinity of the access point of the infrastructure of a WLAN, it is only necessary to modify the control software employed by the microcontroller of an ad hoc participant's radio, to incorporate a synthesizer tuning mechanism that controls a programmable synthesizer, through which operation of the radio's transceiver is controlled, so that operation of each of the ad hoc radio and the WLAN may proceed on a non-interfering basis. No modification to infrastructure mode operation is required. Non-limiting examples of such non-interfering operation include deferral mode, altered hop pattern mode, fixed frequency mode, deactivation mode, and a reduced transmit power mode.

In deferral mode, the tuning control mechanism employed by the ad hoc radio network is operative to defer transmission, in response to detecting that ad hoc radio and the infrastructure networks occupy the same frequency. This technique may be employed regardless of which type of infrastructure network is encountered. The ad hoc radio uses information contained in the monitored beacon which informs FHSS radios operating in the ad hoc mode of the operating parameters of the infrastructure network. For an IEEE 802.11 standards DSSS network, which occupies fixed channels which are about 25 MHz apart, to avoid interference, the FHSS ad hoc radio defers on 25 out of 79 1 MHz channels, or about 30% of the FHSS channels. For an FHSS WLAN infrastructure, in which each channel has an instantaneous bandwidth of only 1 MHz, a lower reduction in throughput is obtained, as the ad hoc network radio defers on only 3 out of 79 channels. As a result, throughput reduction is less than 4%.

Altered hop pattern mode may be used for FHSS systems, such as Bluetooth, that have nominal RF output of 0 dBm, and are able to operate in accordance with FCC low power rules, where there is no requirement to employ spread spectrum modulation, so that changing hop sequences to avoid interference is permissible. The advantage to this approach is that the band occupied by the infrastructure network may be avoided completely. Also, there is no reduction in throughput in either the ad hoc radio or the infrastructure network.

Fixed frequency mode is employed for avoiding interfering with DSSS WLANS, which use center frequencies shifted toward the lower end of the ISM band to avoid excessive out-of-band emissions in the lower restricted band. This frequency shift provides for the use of a set of 1 MHz center frequencies in a range of from 2.476 to 2.480 GHz, so as to provide interference free operation for both Bluetooth and DSSS WLAN radios. The fixed frequency scheme only requires that the Bluetooth radio detect a transmitter on the beacon frequency. It is unnecessary for the beacon signal to be encoded with any other information. The fixed frequencies do not interfere with any DSSS system, regardless of which channels the infrastructure DSSS network is using.

Deactivation mode is intended to be employed where operation of an ad hoc network would result in unacceptable levels of interference to an infrastructure WLAN or other equipment, and local use of ad hoc radio networks could be prohibited and might be desirable. To accommodate this preference, the beacon includes information that causes the ad hoc radio detecting the beacon to simply disable its transmitter, for as long as the radio is within range of the beacon.

BRIEF DESCRIPTION OF THE DRAWINGS

FIGS. 15 and 16 are ISM spectrum diagrams associated with fixed frequency mode of operation of an ad hoc radio;

FIG. 17 diagrammatically shows a beacon generator serially linked to a WLAN infrastructure access point; and FIG. 18 diagrammatically shows a beacon generator linked to a WLAN infrastructure access point by means of a wired LAN.

DETAILED DESCRIPTION

Figure 1:
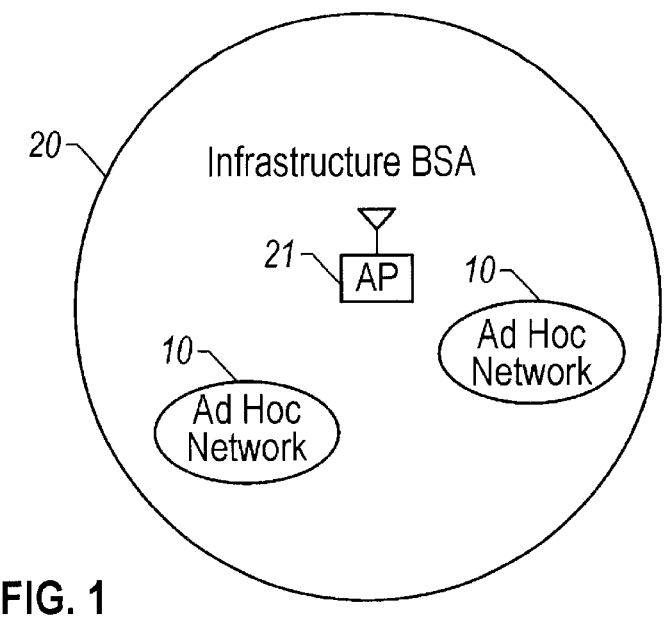
FIG. 1 diagrammatically illustrates a wireless local area network basic service area containing ad hoc wireless radios.
Figure 2:
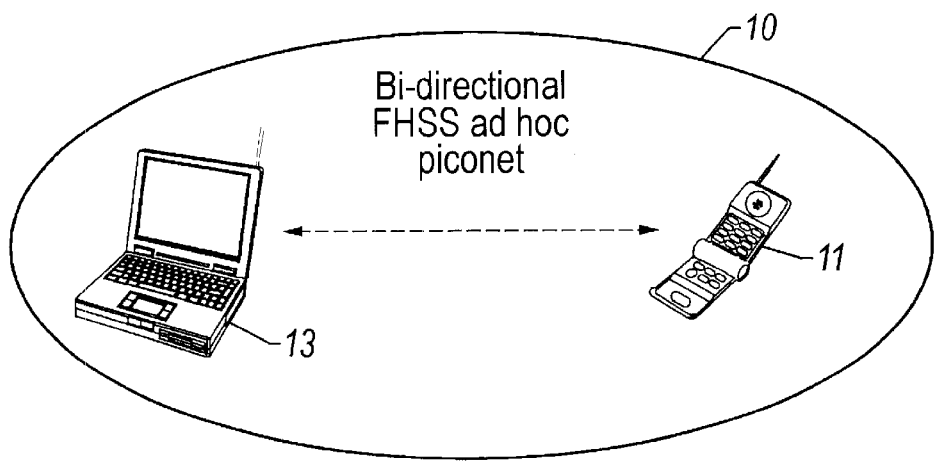
FIG. 2 shows an example of an ad hoc wireless radio network.

Before describing in detail the repetitively pulsed beacon-based, wireless interference prevention mechanism of the present invention, it should be observed that the invention resides primarily in what is effectively a prescribed arrangement of conventional communication circuits and associated digital signal processing components and attendant supervisory control programs therefor, for controllably generating a periodically pulsed warning beacon in the vicinity of a network access point, and a prescribed software tuning mechanism that is installable in the microcontroller of a respective wireless radio for monitoring and responding to the warning beacon.

Consequently, the configuration of such communication and signal processing circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and functional and spectral diagrams associated therewith are primarily intended to show the major components of the invention in a convenient functional grouping and communication signal processing scenario, whereby the present invention may be more readily understood.

Figure 3:
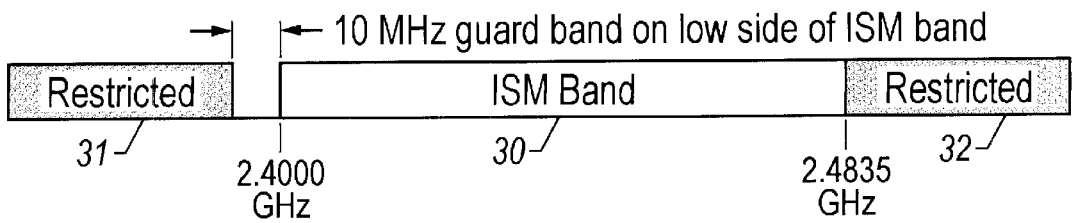
FIG. 3 is a spectrum diagram of the ISM band and adjacent restricted bands.

In order to facilitate an understanding of the interference avoidance mechanism of the present invention, particularly in the context of the spectral characteristics of the ISM band, it is initially useful to review current usage of the ISM band, and FCC restrictions on bands adjacent to this band. As diagrammatically illustrated in the spectrum diagram of FIG. 3, according to FCC regulation 15.205, only spurious emissions are allowed in a band 31, having a spectral range from 2.310 to 2.390 GHz, that is immediately adjacent to the lower end of the ISM band 30, and in a band 32, having a spectral range from 2.4835 to 2.500 GHz, that is immediately adjacent to the upper end of the ISM band 30.

Power limitations are also quite restrictive, in that total spurious power emissions from intentional radiators are limited to less than −41 dBm in these bands. In may noted that the lower restricted band 31 (2.300–2.390 GHz) is spaced 10 MHz below the lower end (2.400 GHz) of the ISM band 30. However, the upper restricted band 32 (2.4835–2.500 GHz) actually borders the top end of the ISM band. The (2.4835–2.500 GHz) restricted band 32 therefore poses a much more severe problem to users of the ISM band 30.

Figure 4:
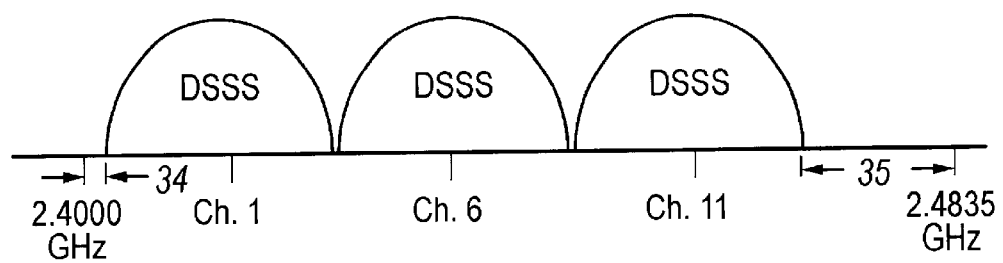
FIG. 4 is an ISM spectrum diagram showing center frequencies for direct-sequence spread spectrum (DSSS) WLANs skewed toward the low end of the ISM band.

As further shown in the spectrum diagram of FIG. 4, in order to conform to out-of-band emissions, center frequencies for direct-sequence spread spectrum (DSSS) WLANs are commonly skewed toward the low end of the ISM band 30. Although there are fourteen overlapping channels defined for DSSS operation in IEEE specification 802.11, only the lowest eleven channels are suitable for use in the U.S., due to the restricted band 32 at 2.4835–2.500 GHz described above. Channel 11, the highest channel allowed in the U.S., has a center frequency of 2.,462 GHz. In order to squeeze three non-overlapping channels into the ISM band, Channels 1, 6, and 11 (having center frequencies of 2.412 GHz, 2.437 GHz, and 2.462 GHz, respectively) are typically employed, as shown in FIG. 4, thereby providing a channel spacing of 25 MHz.

As can be seen in FIG. 4, the channel usage of the ISM band provides a pair of unused regions 34 and 35 at respective upper and lower ends of the ISM band for placement of a pulsed warning beacon, to alert ad hoc network radios (such as frequency hopped spread spectrum (FHSS) radios), that they are spatially close to a WLAN infrastructure access point. In particular, there is a relatively narrow spectral spacing or gap 34 between DSSS channel 1 and lower end of the ISM band 30.

Figure 5:
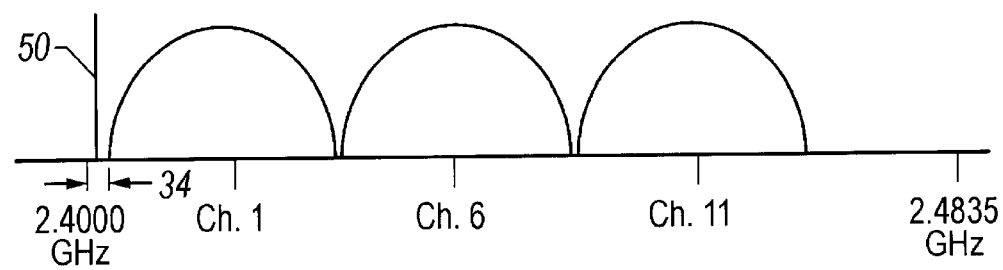
FIG. 5 shows the ISM spectrum diagram of FIG. 4 with a warning beacon placed at 2.401 GHz.
Figure 6:
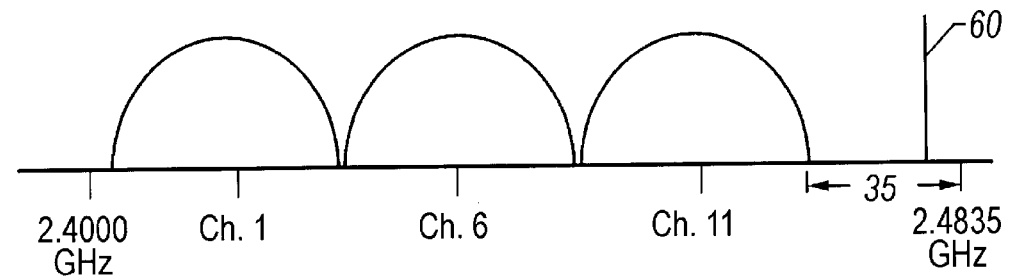
FIG. 6 shows the ISM spectrum diagram of FIG. 4 with a warning beacon placed at 2.482 GHz.

As diagrammatically illustrated in FIG. 5, gap 34 allows for the placement of a beacon 50 at 2.401 GHz, for example, which is 12 MHz from the nearest DSSS channel center frequency (4.412. GHz of channel 10). On the other hand, as shown in FIG. 6, the substantial spectral spacing 35 between DSSS channel 11 and the upper end of the ISM band 30, allows for placement of a beacon 60 at 2.482 GHz, which is 20 MHz away from the center of channel 11 and 1.5 MHz below the upper end of the ISM band. This spacing effectively prevents the possibility that the beacon 60 would disrupt DSSS systems in either the U.S. or Europe.

Frequency hopped spread spectrum (FHSS) systems are also affected by the presence of the restricted band 31 (2.4835–2.500 GHz), but to a lesser degree. Their 1.0 MHz occupied bandwidth allows FHSS radios to employ center frequencies from 2.402 GHz to 2.480 GHz. As a consequence, placing a 1.0 MHz fixed beacon within the lower spectral gap 34 (e.g., at 2.401 GHz) or in the upper gap 35 above 2.481 GHz would not interfere with FHSS channels operating at lower frequencies.

Figure 7:
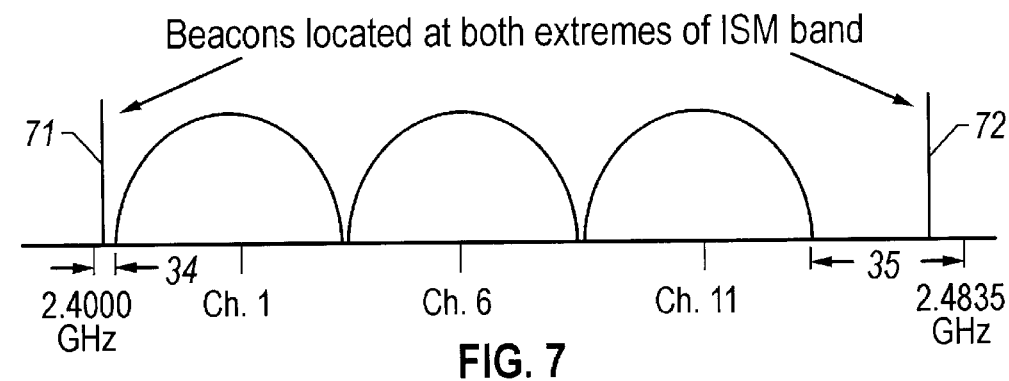
FIG. 7 shows the ISM spectrum diagram of FIG. 4 with a pair of warning beacons placed at 2.401 GHz and 2.482 GHz.

To combat potential fading of the beacon signal, two beacons shown at 71 and 72 in FIG. 7, may be located within the lower and upper spacings 34 and 35, respectively, of the ISM band. For example, by placing beacon 71 at 2.401 GHz and beacon 72 at a prescribed frequency near the top of the band (at 2.482 GHz for example), the probability of loss of beacon signal due to simultaneous fading on two non-correlated channels is significantly reduced.

Figure 8:
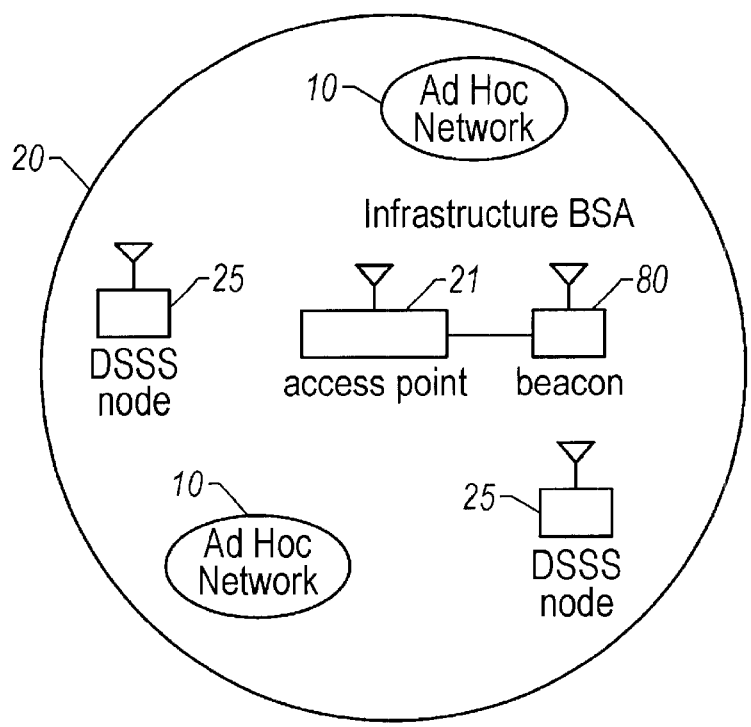
FIG. 8 diagrammatically illustrates a wireless local area network basic service area containing a beacon generator in the vicinity of an infrastructure access point.

In accordance with a preferred embodiment of the invention, not only is the beacon placed at a fixed frequency within the ISM band, but, as diagrammatically illustrated in FIG. 8, it is sourced from a beacon generator 80 that is physically or spatially located in close proximity to and linked with infrastructure access point 21. The beacon generator 80 is operative to periodically generate a pulsed beacon signal which, because of its physical proximity to access point, serves to indicate the presence of infrastructure WLAN and its associated BSA 20 serving DSSS nodes 25. As will be described, by periodically tuning the receive frequency synthesizer of its transceiver to this frequency, an ad hoc network radio, such as an FHSS radio, is able to monitor whether it is in close proximity to an infrastructure network.

Because FCC regulations (FCC 15.249) permit a low power transmitter to periodically increase (or pulse) its transmit power by as much as 20 dB, as long as average power remains below 0 dbm, the beacon signal emitted by beacon generator 80 preferably has a pulsed beacon profile. A non-limiting example of a pulsed beacon profile that may be employed in accordance with the present invention is diagrammatically illustrated in the beacon pulse signal timing diagram of FIG. 9. As shown therein, to conform with the above-referenced FCC regulations, and to ensure adequate range, each periodically generated beacon pulse 90 may have a peak transmit power of +20 dBm and pulse repetition interval of 24 msec. To achieve an average power of 0 dBm, the beacon has a one percent duty cycle, or a pulse width of 240 $\mu$sec., as shown.

In order to convey information relating the operation of the infrastructure network with which the beacon generator is associated, the beacon signal may employ 2-FSK modulation at 1 Mbps. As a non-limiting example, where the BSA is that of a DSSS infrastructure WLAN, the information contained in the beacon modulation includes the center frequency of the occupied channel. In the case of an infrastructure FHSS network, the hop sequence and system clock data are embedded in the beacon modulation.

Figure 10:
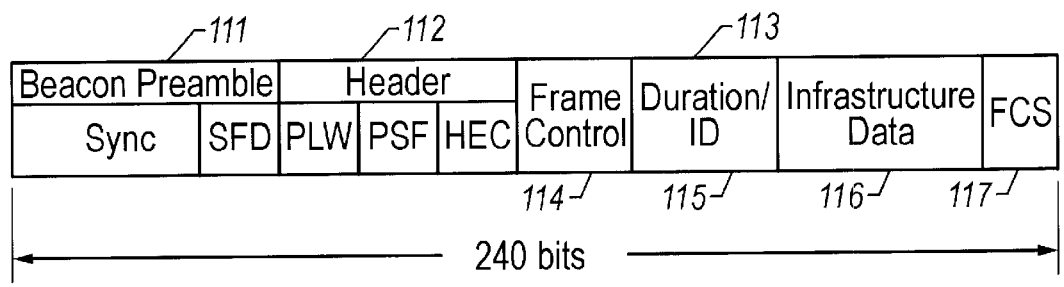
FIG. 10 is an example of a beacon signal framing format.

While the beacon message structure is not limited to any particular format, for the purposes of providing a non-limiting example, a (240 bit) framing format diagrammatically illustrated in FIG. 10, that conforms with IEEE 802.11 FHSS PLCP frame format, may be used. As shown therein, following a beacon preamble 111 and header 112 is a fourteen byte message 113, that includes a Frame Control segment 114, a Duration/AP identification segment 115, an infrastructure data segment 116, which may include modulation scheme, channel, and timing information, and a check sum segment 117.

The present example of a beacon pulse repetition interval of 24 msec. implies that an ad hoc FHSS radio must tune to the beacon frequency and dwell on that channel for at least 24 msec. Where the tuning algorithm of the FHSS radio causes its transceiver's receive synthesizer to tune itself to the beacon channel every five seconds, as a non-limiting example, the resulting reduction in system throughput for ad hoc network 10 due to beacon monitoring is extremely small. For the present example, the percentage reduction in throughput=24 msec/5 sec=0.48%.

Figure 11:
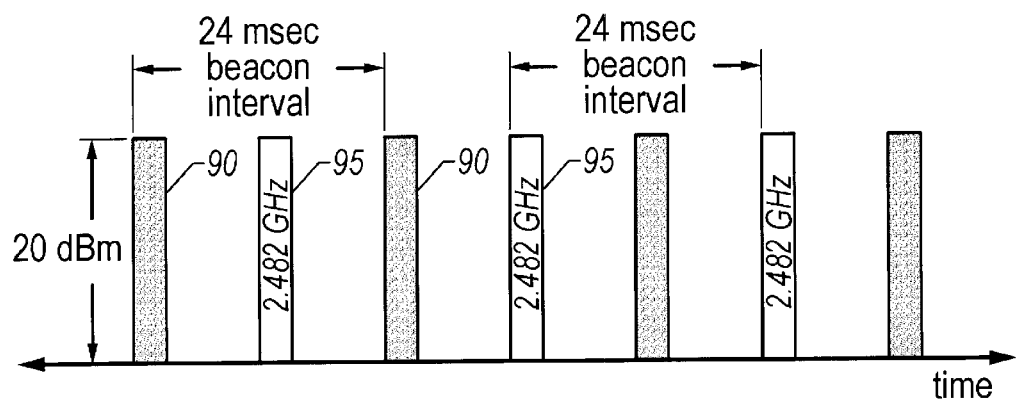
FIG. 11 is a timing diagram showing a pair of time-interleaved or alternating beacon signals.

For enhanced reliability, where two beacons are employed to combat potential fading of the beacon signal, as described above with reference to FIG. 7, beacon generator 80 may be configured to generate a pair of time-interleaved or alternating pulsed beacon signals, as shown at 90 and 95 in the dual beacon timing diagram of FIG. 11. For the present example of using a beacon period of 24 msec. with a 1% duty cycle, interleaving two beacons provides ample time to switch to the alternate beacon channel. In this dual mode operation, there is no additional throughput penalty, and there is a reasonably high probability that both beacon channels will not fade simultaneously. In dual beacon mode, beacon detection would take ten seconds, at most.

As shown in FIGS. 4–6, channel assignments of the ISM band provide for spectral placement of the beacon frequency at either or both the upper and lower ends of the band. For purposes of the present description, it has been assumed that all FHSS systems employ the same channel definition scheme. Bluetooth, IEEE 802.11 FHSS, and HomeRF employ 1 MHz occupied bandwidths. All three systems use 79 channels spaced at 1 MHz starting at 2.402 GHz up to 2.480 GHz. This means that the pulsed beacon may located at 2.401 GHz in the lower spectral gap 34 (e.g., at 2.401 GHz) or in the upper gap 35 above 2.481 GHz.

The substantial spectral spacing 35 at the upper end of the ISM band allows for placement of a beacon 60 at 2.482 GHz, which is 20 MHz away from the center of channel 11 and 1.5 MHz below the upper end of the ISM band. While locating the beacon near the top of the ISM band requires the use of more precision filtering to avoid excessive out-of-band emissions, such spectral placement virtually guarantees that the beacon will not interfere with FHSS or DSSS radios. While the use of a high precision filter entails an increase in cost, the cost is only associated with the signal processing functionality of the beacon generator, not with the ad hoc networks. No additional filter requirements are imposed on the ad hoc radios, since these mobil nodes operate in a "listen only" mode on the beacon frequency. The overall impact on cost is therefore modest.

Figure 12:
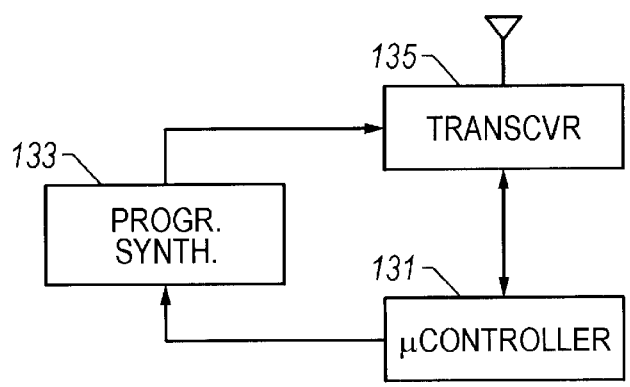
FIG. 12 diagrammatically illustrates an ad hoc radio.

In order to monitor and respond to the pulsed warning beacon that is sourced from the vicinity of the access point of the infrastructure of a WLAN, it is only necessary to modify the control software employed by the microcontroller of an ad hoc participant's radio. Namely, as diagrammatically illustrated in FIG. 12, the ad hoc radio's to microcontroller 131 is upgraded to incorporate a synthesizer tuning mechanism that controls a programmable synthesizer 133, through which operation of the radio's transceiver 135 is controlled, so that operation of each of the ad hoc radio and the WLAN may proceed on a non-interfering basis. No modification to infrastructure mode operation is required. Non-limiting examples of such non-interfering operation include the following interference avoidance modes: 1—deferral mode; 2—altered hop pattern mode; 3—fixed frequency mode; 4—deactivation mode; and 5—low transmit power mode. Each of these respective modes will be described individually below.

Figure 13:
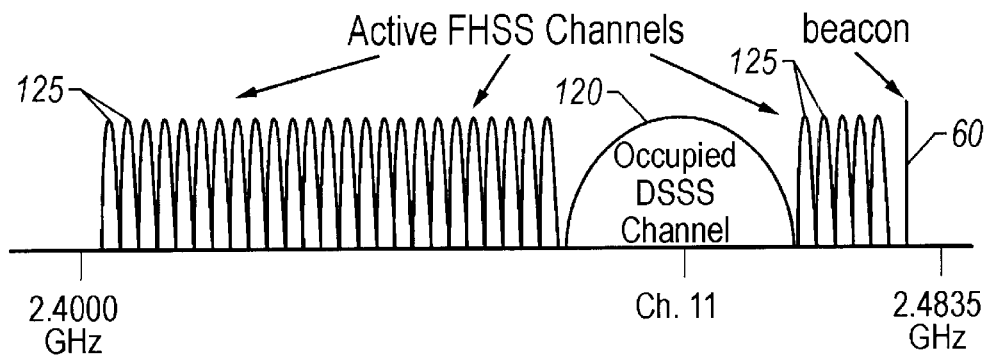
FIGS. 13 and 14 are ISM spectrum diagrams associated with deferral mode of operation of an ad hoc radio.
Figure 14:
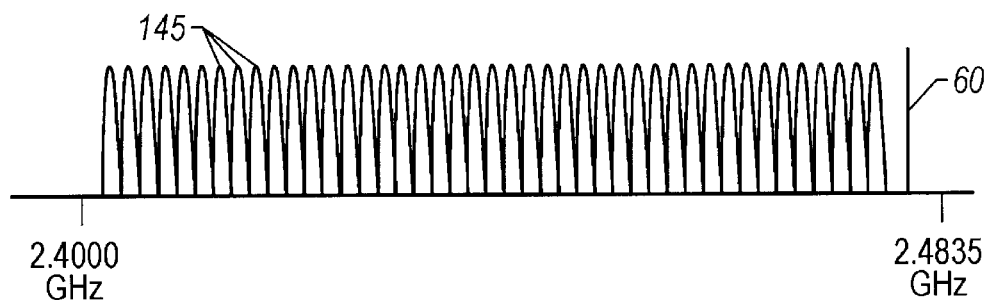

1—Deferral Mode (FIGS. 13 and 14)

As described previously, embedded within the beacon signal is information relating the operation of the infrastructure network with which the beacon generator is associated. For example of a DSSS infrastructure WLAN, that information includes the center frequency of the occupied channel. For an infrastructure FHSS network, the hop sequence and system clock data are embedded in the beacon modulation. Because the monitored beacon informs FHSS radios operating in the ad hoc mode of the operating parameters of the infrastructure network, in this mode of operation, the tuning control mechanism employed by the ad hoc radio network is operative to defer transmission in response to detecting that ad hoc radio and the infrastructure networks occupy the same frequency. This technique may be employed regardless of which type of infrastructure network is encountered.

Where the infrastructure network is an IEEE 802.11 DSSS network, deferral results in approximately a 30% reduction in throughput for the ad hoc radio. As mentioned previously with reference to FIG. 3, and as shown in the spectrum diagram of FIG. 13, a DSSS network occupies fixed channels 120 which are about 25 MHz apart, as shown for DSSS channel 11. In order to avoid interference, the FHSS ad hoc radio defers on 25 out of 79 1 MHz channels 125, or about 30% of the FHSS channels. For an FHSS WLAN infrastructure, in which each channel has an instantaneous bandwidth of only 1 MHz, as shown in the spectrum diagram of FIG. 14, a lower reduction in throughput is obtained. In such an FHSS system, since the ad hoc network radio needs to defer on only 3 out of 79 channels 145, throughput reduction is less than 4%.

2—Altered Hop Pattern Mode

Some FHSS systems, such as Bluetooth, have nominal RF output of 0 dBm. As a consequence they are able to operate in accordance with FCC low power rules (FCC reg. no. 15.249). Under these rules, there is no requirement to employ spread spectrum modulation, so that changing hop sequences to avoid interference is permissible. The advantage to this approach is that the band occupied by the infrastructure network may be avoided completely. Also, there is no reduction in throughput to either the ad hoc or the infrastructure network.

Figure 15:
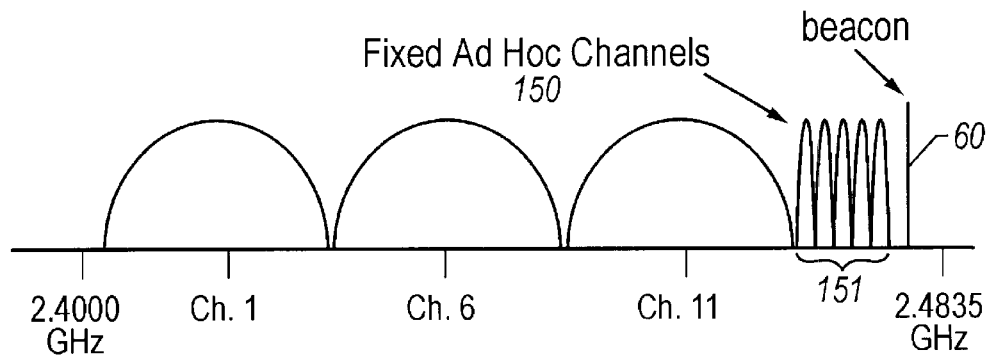

3—Fixed Frequency Mode (FIGS. 15 and 16)

In order to avoid interfering with DSSS WLANS, a low power FHSS radio (e.g. Bluetooth radio) detecting the warning beacon enters into a fixed frequency operating mode. DSSS WLANs use center frequencies shifted toward the lower end of the ISM band to avoid excessive out-of-band emissions in the lower restricted band. This frequency shift provides for the use of a set of 1 MHz center frequencies 150 in a range 151 of from 2.476 to 2.480 GHz, as shown in the spectrum diagram of FIG. 15, and listed in the Table of FIG. 16, so as to provide interference free operation for both Bluetooth and DSSS WLAN radios.

Advantageously, the fixed frequency scheme of FIG. 15 is relatively simple to implement and only requires the Bluetooth radio to detect a transmitter on the beacon frequency. It is unnecessary for the beacon signal to be encoded with any other information. The fixed frequencies do not interfere with any DSSS system, regardless of which channels the infrastructure DSSS network is using. It should also be noted that the frequencies listed in the Table of FIG. 16 may constitute a reduced hop set, if three DSSS networks operating on non-overlapping channels were co-located within the same BSA.

4—Deactivation Mode

This mode is intended to be employed in the situation where operation of an ad hoc network would result in unacceptable levels of interference to an infrastructure WLAN or other equipment. In this situation, the local use of ad hoc radio networks could be prohibited and might be desirable. To accommodate this preference, in this mode, the beacon includes information that causes the ad hoc radio detecting the beacon to simply disable its transmitter, for as long as the radio is within the BSA (detects the beacon). Alternately, the beacon could shut down the adhoc radio nodes for a specified period of time, or until manually reactivated by the user.

5—Reduced Transmit Power Mode

This mode is intended to reduce, but not eliminate interference. Upon detecting the beacon—indicating the presence of an infrastructure network—the nodes in an ad hoc network reduce transmit power to a predetermined level, such as −10 or −20 dBm, as non-limiting examples.

As described above, with reference to FIG. 8, modification of an existing WLAN infrastructure involves installation of a beacon generator 80 at a location that is physically or spatially located in close proximity to and linked with infrastructure access point 21. By close proximity is meant that the beacon generator 80 and access point 21 are spaced sufficiently far apart to provide isolation that minimizes adjacent channel interference; yet they are still close enough to ensure the AP and beacon coverage areas are approximately the same. For this purpose, for a typical WLAN infrastructure and beacon generator that conforms with the above described operational parameters, the beacon generator 80 and access point 21 may be located about two or three meters apart. Because of its physical proximity to the access point, when detected by an ad hoc (mobile) radio that periodically tunes its receive frequency synthesizer to the beacon frequency, the ad hoc network radio is able to determine whether it is in close proximity to an infrastructure network, so that it may execute a prescribed interference avoidance mode such as those described above.

As diagrammatically shown in FIG. 17, the beacon generator 80 may be interfaced via a serial link 170 with the access point 21 in order to convey information about AP spectrum utilization to the mobile nodes. Alternatively, the beacon generator may communicate with the access point via a wired LAN (Ethernet) 180 as shown in FIG. 18. By definition, all access points interface with the wired LAN infrastructure. In either case, the beacon generator 80 is located in close physical proximity to the AP 21 to ensure the areas of coverage for the beacon and AP are approximately the same. Communication from the access point to the beacon generator need not occur frequently, since it is only necessary to communicate when the access point 21 is turned on or off, or when the beacon frequency channel is changed. As described previously, beacon broadcast information may include the AP occupied channel (DSSS infrastructure), or AP hop sequence and timing data (FHSS infrastructure).

As will be appreciated from the foregoing description of the present invention, the above described problem of potential ad hoc radio—WLAN infrastructure interference can be substantially reduced or effectively avoided in accordance with the present invention, by taking advantage of the availability of a prescribed unused region of portion of the ISM band to generate a warning beacon. The use of a warning beacon alerts ad hoc network radios that come within the coverage of the BSA of the WLAN that they are spatially close to a WLAN infrastructure access point, and thereby in the range of potential interference with the WLAN. In response, each ad hoc radio's tuning control mechanism adjusts the radio so that it transmits on one or more non-interfering ISM band channels.

Figure 9:
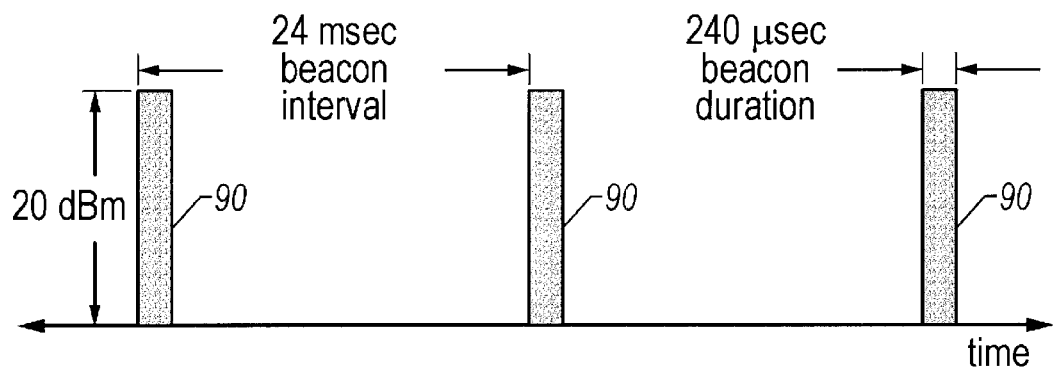
FIG. 9 is a timing diagram of a non-limiting example of a pulsed beacon profile that may be employed in accordance with the present invention.

As pointed out above, the beacon signal emitted by beacon generator 80 preferably has a pulsed, very low duty cycle profile, such as that diagrammatically illustrated in the beacon pulse signal timing diagram of FIG. 9. The purpose of using a low duty cycle high peak amplitude pulse beacon waveform provides a reasonable coverage range from the WLAN access point, while ensuring that the total emitted beacon energy will comply with the less than 0 dBm average power restrictions of FCC regulation 15.249.

In an alternative embodiment, where the effective range of the beacon may be significantly limited, such as in a controlled access (security) passageway through which the ad hoc network must pass, rather than employ a low duty cycle pulsed beacon signal, a very low power, continuous beacon tone having an average emitted power less than 0 dBm so as to comply with the power restriction requirements of FCC regulation 15.249. may be employed. As a non-limiting example, such a continuous tone, low power beacon may be installed at a passenger gate of a commercial airport, to controllably restrict (e.g., inhibit or disable) operation of ad hoc radios associated with a notebook computer or cell phones carried by passengers boarding a commercial aircraft. In addition to disabling the ad hoc network, this alternative embodiment also may be used to totally disable a passenger's cell phone, and thereby provide a mechanism that automatically facilitates passenger compliance with FAA regulations prohibiting use of cellular phones and the like on board commercial aircraft.

While I have shown and described several embodiments in accordance with the present invention, it is to be understood that the same is not limited thereto but is susceptible to numerous changes and modifications as are known to a person skilled in the art, and I therefore do not wish to be limited to the details shown and described herein, but intend to cover all such changes and modifications as are obvious to one of ordinary skill in the art.

What is claimed is:

1. For use with a communication network having a wireless access point through which wireless connectivity is available for users of said communication network within a first portion of a prescribed band of the wireless communication spectrum, a method of preventing interference between first wireless communication devices of said users of said communication network and second wireless communication devices of others than said users of said communication network, who are capable of transmitting within said first portion of said prescribed band of said wireless communication spectrum, said method comprising the steps of:

(a) at a location in the vicinity of said wireless access point, generating a wireless beacon in a second portion of said prescribed band of said wireless communication spectrum that does not overlap said first portion of said prescribed band of said wireless communication spectrum;

(b) at a second wireless communication device, monitoring said second portion of said prescribed band of said wireless communication spectrum for the presence of said wireless beacon; and (c) in response to detecting said wireless beacon, causing said second wireless communication device to avoid use of said first portion of said prescribed band of said wireless communication spectrum.

2. A method according to claim 1, wherein step (c) comprises, in response to detecting said wireless beacon, causing said second wireless communication device to transmit within a selected portion of said prescribed band of said wireless communication spectrum other than said first and second portions of said prescribed band of said wireless communication spectrum.

3. A method according to claim 1, wherein connectivity between said users of said communication network and said wireless access point is provided within a first subportion of said first portion of said prescribed band of said wireless communication spectrum, and wherein step (c) comprises, in response to detecting said wireless beacon, causing said second wireless communication device to transmit within a second subportion of said first portion of said prescribed band of said wireless communication spectrum that does not overlap said first subportion of said first and second portions of said prescribed band of said wireless communication spectrum.

4. A method according to claim 3, wherein said first subportion of said second portion of said prescribed band of said wireless communication spectrum has bandwidth smaller than bandwidth of said first subportion of said first portion of said prescribed band of said wireless communication spectrum.

5. A method according to claim 1, wherein step (c) comprises causing said second wireless communication device to conduct frequency hop communications within said selected portion of said prescribed band of said wireless communication spectrum other than said first portion of said prescribed band of said wireless communication spectrum.

6. A method according to claim 1, wherein said wireless connectivity is available for users of said communication network within the entirety of said first portion of a prescribed band of the said communication spectrum, and wherein step (c) comprises, in response to detecting said wireless beacon, causing said second wireless communication device to transmit within a portion of said prescribed band of said wireless communication spectrum exclusive of said first and second portions of said prescribed band of said wireless communication spectrum.

7. A method according to claim 6, wherein step (c) comprises causing said second wireless communication device to transmit at a fixed frequency channel within said prescribed band of said wireless communication spectrum.

8. A method according to claim 1, wherein said prescribed band of the wireless communication spectrum comprises the unlicensed industrial, scientific and medical (ISM) band.

9. A method according to claim 1, wherein said second portion is above said first portion of said prescribed band.

10. A method according to claim 1, wherein said second portion is below said first portion of said prescribed band.

11. A method according to claim 1, wherein step (a) comprises intermittently transmitting a pulsed wireless beacon in said second portion of said prescribed band of said wireless communication spectrum.

12. A method according to claim 11, wherein step (a) comprises periodically transmitting said pulsed wireless beacon at a fixed frequency in said second portion of said prescribed band of said wireless communication spectrum.

13. A method according to claim 11, wherein said pulsed wireless beacon transmitted in step (a) has a prescribed amplitude and a duration that results in an average power of said pulsed wireless beacon being no greater than 0 dBm.

14. A method according to claim 12, wherein said pulsed wireless beacon transmitted in step (a) has a peak power no larger than +20 dBm and a duty cycle that results in an average power no greater than 0 dBm.

15. A method according to claim 1, wherein said wireless beacon contains information representative of first frequency hop communications, within said first portion of said prescribed band of said wireless communication spectrum, through which said wireless connectivity with said communication network is provided by way of said wireless access point, and wherein step (c) comprises causing said second wireless communication device to conduct second frequency hop communications within said prescribed band of said wireless communication spectrum that avoids said first frequency hop communications.

16. A method according to claim 1, wherein step (b) comprises periodically monitoring said second portion of said prescribed band of said wireless communication spectrum for the presence of said wireless beacon.

17. A method according to claim 1, wherein step (b) comprises periodically tuning second wireless communication device to said second portion of said prescribed band of said wireless communication spectrum for a prescribed dwell interval.

18. A method according to claim 1, wherein step (a) comprises repetitively transmitting said pulsed wireless beacon at a first frequency, and wherein step (b) comprises periodically tuning said second wireless communication device to said first frequency, at a second frequency lower than said first frequency, and for a dwell interval that spans the period of said first frequency.

19. A method according to claim 1, wherein
step (a) comprises generating a further wireless beacon in a third portion of said prescribed band of said wireless communication spectrum that does not overlap said first portion of said prescribed band of said wireless communication spectrum,
step (b) comprises at a second wireless communication device, monitoring said third portion of said prescribed band of said wireless communication spectrum for the presence of said further wireless beacon, and
step (c) comprises, in response to detecting either wireless beacon, causing said second wireless communication device to avoid use of said first portion of said prescribed band of said wireless communication spectrum.

20. A method according to claim 19, wherein said second portion of said prescribed band is above said first portion of said prescribed band, and said third portion of said prescribed band is below said first portion of said prescribed band.

21. A method according to claim 1, wherein step (c) comprises, in response to detecting said wireless beacon, preventing said second wireless communication device from transmitting.

22. A method according to claim 1, wherein step (c) comprises, in response to detecting said wireless beacon, reducing transmit power of said second wireless communication device.

23. A method according to claim 1, wherein said second wireless communication device is operative to conduct frequency hopped spread spectrum communications with another wireless communication device.

24. A method according to claim 1, wherein said first wireless communication device is operative to conduct direct sequence spread spectrum communications with said access point.

25. A system for preventing interference between first wireless communication devices of users of a communication network, which has a wireless access point through which wireless connectivity is available for said users of said communication network within a first portion of a prescribed band of the wireless communication spectrum, and second wireless communication devices of others than said users of said communication network, who are capable of transmitting within said first portion of said prescribed band of said wireless communication spectrum, said system comprising:
a wireless beacon generator installed in the vicinity of said wireless access point, and being operative to generate a wireless beacon in a second portion of said prescribed band of said wireless communication spectrum that does not overlap said first portion of said prescribed band of said wireless communication spectrum; and
a beacon responsive mechanism installed in said second wireless communication device, and being operative to monitor said second portion of said prescribed band of said wireless communication spectrum for the presence of said wireless beacon and, in response to detecting said wireless beacon, being operative to control the operation of said second wireless communication device so as to avoid use of said first and second portions of said prescribed band of said wireless communication spectrum.

26. A system according to claim 25, wherein said beacon responsive mechanism is operative, in response to detecting said wireless beacon, to cause said second wireless communication device to transmit within a selected portion of said prescribed band of said wireless communication spectrum other than said first and second portions of said prescribed band of said wireless communication spectrum.

27. A system according to claim 25, wherein connectivity between said users of said communication network and said wireless access point is provided within a first subportion of said first portion of said prescribed band of said wireless communication spectrum, and wherein said beacon responsive mechanism is operative, in response to detecting said wireless beacon, to cause said second wireless communication device to transmit within a second subportion of said first portion of said prescribed band of said wireless communication spectrum that does not overlap said first subportion of said first portion of said prescribed band of said wireless communication spectrum.

28. A system according to claim 27, wherein said second subportion of said first portion of said prescribed band of said wireless communication spectrum has bandwidth smaller than bandwidth of said first subportion of said first portion of said prescribed band of said wireless communication spectrum.

29. A system according to claim 25, wherein said beacon responsive mechanism is operative to cause said second wireless communication device to conduct frequency hop communications within said selected portion of said prescribed band of said wireless communication spectrum other than said first portion of said prescribed band of said wireless communication spectrum.

30. A system according to claim 25, wherein said wireless connectivity is available for users of said communication network within the entirety of said first portion of a prescribed band of the said communication spectrum, and wherein said beacon responsive mechanism is operative, in response to detecting said wireless beacon, to cause said second wireless communication device to transmit within a second portion of said prescribed band of said wireless communication spectrum exclusive of said first portion of said prescribed band of said wireless communication spectrum.

31. A system according to claim 30, wherein said beacon responsive mechanism is operative to cause said second wireless communication device to transmit at a fixed frequency channel within said second portion of said prescribed band of said wireless communication spectrum.

32. A system according to claim 25, wherein said prescribed band of the wireless communication spectrum comprises the unlicensed industrial, scientific and medical (ISM) band.

33. A system according to claim 25, wherein said wireless beacon generator is operative to intermittently transmit a pulsed wireless beacon in said second portion of said prescribed band of said wireless communication spectrum.

34. A system according to claim 33, wherein said wireless beacon generator is operative to periodically transmit said pulsed wireless beacon at a fixed frequency in said second portion of said prescribed band of said wireless communication spectrum.

35. A system according to claim 25, wherein said wireless beacon contains information representative of first frequency hop communications, within said first portion of said prescribed band of said wireless communication spectrum, through which said wireless connectivity with said communication network is provided by way of said wireless access point, and wherein said beacon responsive mechanism is operative to cause said second wireless communication device to conduct second frequency hop communications within said prescribed band of said wireless communication spectrum that avoids said first frequency hop communications.

36. A system according to claim 25, wherein said beacon responsive mechanism is operative to periodically monitor said second portion of said prescribed band of said wireless communication spectrum for the presence of said wireless beacon.

37. A system according to claim 25, wherein said beacon responsive mechanism is operative to periodically tune second wireless communication device to said second portion of said prescribed band of said wireless communication spectrum for a prescribed dwell interval.

38. A system according to claim 25, wherein said wireless beacon generator installed is operative to repetitively transmit said pulsed wireless beacon at a first frequency, and wherein said beacon responsive mechanism is operative to periodically tune said second wireless communication device to said first frequency, at a second frequency lower than said first frequency, and for a dwell interval that spans the period of said first frequency.

39. A system according to claim 25, wherein said wireless beacon generator is operative to generate a further wireless beacon in a third portion of said prescribed band of said wireless communication spectrum that does not overlap said first portion of said prescribed band of said wireless communication spectrum, and said beacon responsive mechanism is operative to monitor said third portion of said prescribed band of said wireless communication spectrum for the presence of said further wireless beacon and, in response to detecting either wireless beacon, to cause said second wireless communication device to avoid use of said first portion of said prescribed band of said wireless communication spectrum.

40. A system according to claim 39, wherein said second portion of said prescribed band is above said first portion of said prescribed band, and said third portion of said prescribed band is below said first portion of said prescribed band.

41. A system according to claim 25, wherein said beacon responsive mechanism is operative to inhibit said second wireless communication device from transmitting in response to detecting said wireless beacon.

42. A system according to claim 25, wherein said beacon responsive mechanism is operative to reduce transmit power of said second wireless communication device in response to detecting said wireless beacon.

43. A system according to claim 25, wherein said second wireless communication device is operative to conduct frequency hopped spread spectrum communications with another wireless communication device.

44. A system according to claim 25, wherein said first wireless communication device is operative to conduct direct sequence spread spectrum communications with said access point.

* * * * *